(12) United States Patent
Niesten et al.

(10) Patent No.: US 8,946,315 B2
(45) Date of Patent: Feb. 3, 2015

(54) HYDROPHILIC ALIPHATIC POLYURETHANE FOAMS

(75) Inventors: Meike Niesten, Köln (DE); Sebastian Dörr, Düsseldorf (DE)

(73) Assignee: Bayer Intellectual Property GmbH, Monheim (DE)

( * ) Notice: Subject to any disclaimer, the term of this patent is extended or adjusted under 35 U.S.C. 154(b) by 29 days.

(21) Appl. No.: 13/521,333

(22) PCT Filed: Jan. 7, 2011

(86) PCT No.: PCT/EP2011/050168
§ 371 (c)(1),
(2), (4) Date: Jul. 10, 2012

(87) PCT Pub. No.: WO2011/083144
PCT Pub. Date: Jul. 14, 2011

(65) Prior Publication Data
US 2012/0289622 A1   Nov. 15, 2012

(30) Foreign Application Priority Data
Jan. 11, 2010 (EP) .................................... 10000158

(51) Int. Cl.
C08G 18/00 (2006.01)
C08G 18/79 (2006.01)
C08G 18/28 (2006.01)
C08G 18/70 (2006.01)
C08G 101/00 (2006.01)

(52) U.S. Cl.
CPC ............ *C08G 18/792* (2013.01); *C08G 18/283* (2013.01); *C08G 18/706* (2013.01); *C08G 18/798* (2013.01); *C08G 2101/0008* (2013.01); *C08G 2101/0058* (2013.01); *C08G 2101/0066* (2013.01); *C08G 2101/0083* (2013.01)
USPC ............................ 521/161; 521/159; 521/160

(58) Field of Classification Search
USPC ................................................ 521/159–161
See application file for complete search history.

(56) References Cited

U.S. PATENT DOCUMENTS

| 3,903,232 | A | | 9/1975 | Wood et al. |
| 4,724,250 | A | * | 2/1988 | Schubert et al. .............. 524/707 |
| 5,017,625 | A | * | 5/1991 | Ansell ............................ 521/159 |
| 5,064,653 | A | | 11/1991 | Sessions et al. |
| 5,065,752 | A | | 11/1991 | Sessions et al. |
| 5,164,421 | A | * | 11/1992 | Kiamil et al. .................. 521/159 |
| 5,252,617 | A | * | 10/1993 | Werner et al. ................... 521/56 |
| 5,296,518 | A | | 3/1994 | Grasel et al. |
| 5,670,599 | A | * | 9/1997 | Bassner .......................... 528/59 |
| 6,191,179 | B1 | | 2/2001 | Scherzer et al. |
| 6,992,133 | B2 | * | 1/2006 | Yokoyama et al. ............ 524/601 |
| 2004/0162359 | A1 | * | 8/2004 | Barber et al. .................. 521/159 |
| 2005/0027092 | A1 | * | 2/2005 | Steidl et al. ...................... 528/44 |
| 2009/0054542 | A1 | | 2/2009 | Schoenberger |
| 2009/0264558 | A1 | * | 10/2009 | Kramer et al. ................. 523/400 |
| 2011/0184080 | A1 | | 7/2011 | Schonberger et al. |
| 2012/0157559 | A1 | | 6/2012 | Dorr et al. |
| 2012/0329895 | A1 | * | 12/2012 | Sommer et al. ................ 521/149 |
| 2013/0109774 | A1 | * | 5/2013 | Dorr et al. ...................... 521/159 |

FOREIGN PATENT DOCUMENTS

| DK | 2300510 T3 | 3/2012 |
| EP | 0299122 A1 | 1/1989 |
| EP | 949285 A1 | 10/1999 |
| EP | 2143744 A1 * | 7/2008 |
| EP | 2028223 A1 | 2/2009 |
| EP | 2289959 A1 | 3/2011 |
| GB | 1571730 A | 7/1980 |
| WO | WO-95/30045 A2 | 11/1995 |
| WO | WO-03/097727 A1 | 11/2003 |

OTHER PUBLICATIONS

Machine translation of description of WO 95/30045 obtained from European Patent Office on May 2, 2014.*
International Search Report for PCT/EP2011/050168 mailed Feb. 23, 2011.

* cited by examiner

*Primary Examiner* — Melissa Rioja
(74) *Attorney, Agent, or Firm* — Drinker Biddle & Reath LLP

(57) ABSTRACT

The invention relates to hydrophilic, aliphatic polyurethane foams, which are accessible by reacting hydrophilic polyisocyanates in the presence of water. Due to the absorption properties thereof, the polyurethane foams are in particular suited for producing wound dressings, cosmetic articles or incontinence products.

12 Claims, No Drawings

HYDROPHILIC ALIPHATIC POLYURETHANE FOAMS

RELATED APPLICATIONS

This application is a national stage application (under 35 U.S.C. §371) of PCT/EP2011/050168, filed Jan. 7, 2011, which claims benefit of European Patent Application No. 10000158.5, filed Jan. 11, 2010.

The invention relates to hydrophilic aliphatic polyurethane foams which are obtainable by reaction of hydrophilic polyisocyanates in the presence of water. Owing to their absorptive properties, the polyurethane foams are particularly useful in the manufacture of wound dressings, cosmetic articles or incontinence products.

EP-A 949285 describes the reaction of polyisocyanates with primary diamines, low molecular weight polyols and high molecular weight polyols. This reaction does not preclude the possibility that appreciable portions of the isocyanate-reactive substances are not converted and are subsequently extractable from the hydrophilic foam.

GB 1571730 describes the reaction of high vapor pressure diisocyanates such as isophorone diisocyanate (IPDI) and bis(isocyanatocyclohexyl)methane (HMDI) with polyols. Again, unconverted components are left behind. Moreover, using free, non-derivatized diisocyanates is problematic from an occupational hygiene viewpoint. WO 2004013215 likewise utilizes volatile diisocyanates.

WO 2003/097727, U.S. Pat. Nos. 5,065,752 and 5,064,653 describe the foam-forming reaction of prepolymers in the presence of acrylamide-acrylic acid copolymers. These products are not chemically attached and are completely extractable, which is not desirable.

In U.S. Pat. Nos. 3,903,232 and 388,941, prepolymers are reacted with polyethers. Again, there is a risk of unattached polyols being produced. U.S. Pat. No. 5,296,518 similarly describes the reaction of prepolymers with polyethers wherein three different polyols are used, which calls the economics of this process into question. Furthermore, the process described therein is incapable of making certain that there are no low molecular weight isocyanates left in the mixture, which would not be desirable. The preparation of the prepolymers usually requires uneconomically long reaction times.

The as yet unpublished European patent application of application number 08012372.2 describes hydrophilic aliphatic polyurethane foams based on low-monomer prepolymers. However, the hydrophilicity of the resulting foams is limited. EP 08012372.2 does not disclose any polyurethane foams containing additional hydrophilic polyisocyanates.

The as yet unpublished European patent application of application number 09011102.2 describes a process for preparing hydrophilic aliphatic polyurethane foams from isocyanate-functional prepolymers, hydrophilic polyisocyanates and water.

Either the known polyurethane foams have an inadequate imbibition ability in respect of hydrophilic fluids, or they contain extractable substances that have to be classified as problematical with regard to their cell compatibility.

The present invention therefore has for its object to provide a process for preparing polyurethane foams which include but little by way of extractable constituents, are cell compatible, are capable of rapidly imbibing a large amount of hydrophilic fluids such as physiological saline or wound fluid, and are deformable such that they are able to optimally conform to the shape of a wound for example.

This object is achieved according to the invention by a process for preparing hydrophilic aliphatic polyurethane foams wherein compositions comprising
A) hydrophilic polyisocyanates obtainable by reaction of
   A1) low molecular weight aliphatic diisocyanates having a molar mass of 140 to 278 g/mol and/or polyisocyanates obtainable therefrom with an isocyanate functionality of 2 to 6, with
   A2) monofunctional polyalkylene oxides having an OH number of 10 to 250, and an ethylene oxide content of 50 to 100 mol % based on the total amount of oxyalkylene groups present,
B) heterocyclic 4-ring or 6-ring oligomers of low molecular weight aliphatic diisocyanates having a molar mass of 140 to 278 g/mol,
C) water,
D) optionally catalysts,
E) optionally $C_8$ to $C_{22}$ monocarboxylic acids or their ammonium or alkali metal salts or $C_{12}$ to $C_{44}$ dicarboxylic acids or their ammonium or alkali metal salts,
F) optionally surfactants,
G) optionally mono- or polyhydric alcohols, and
H) no isocyanate-functional prepolymer having a weight fraction of low molecular weight aliphatic diisocyanates having a molar mass of 140 to 278 g/mol of below 1.0% by weight based on the prepolymer, obtainable by reaction of
   H1) low molecular weight aliphatic diisocyanates having a molar mass of 140 to 278 g/mol with
   H2) di- to hexafunctional polyalkylene oxides having an OH number of 22.5 to 112 mg KOH/g and an ethylene oxide content of 50 to 100 mol % based on the total amount of oxyalkylene groups present,
are provided, foamed and cured.

It was found that hydrophilic, flexible foams are surprisingly obtainable using mixtures of hydrophilic and non-hydrophilic polyisocyanates by reacting this mixture with water. It has transpired that what is obtained without hydrophilic polyisocyanate is not a foam but a transparent film, and that what is obtained without non-hydrophilic polyisocyanate is in turn a brittle foam without coherency, which immediately turns into crumbs. Therefore, a foam having the desired properties is only obtained when a combination of hydrophilic and non-hydrophilic polyisocyanates is used according to the present invention.

Unlike the EP 09011102.2 application, which was unpublished at the priority date of the present invention, the process of the present invention utilizes a composition that does not include an isocyanate-functional prepolymer H).

Preference is given to using hydrophilic polyisocyanate A) having an NCO content of 0.3% to 20% by weight, preferably of 2% to 10% by weight and more preferably of 3% to 6% by weight.

The hydrophilic polyisocyanates A) are typically prepared by adjusting the ratio of monofunctional polyalkylene oxides A2) to low molecular weight aliphatic diisocyanates A1) such that for every 1 mol of OH groups of the monofunctional polyalkylene oxides there are from 1.25 to 15 mol, preferably from 2 to 10 mol and more preferably from 2 to 6 mol of NCO groups of low molecular weight aliphatic diisocyanate A1). This is followed by the allophanatization/biuretization and/or isocyanurate formation/uretdione formation. When the polyalkylene oxides A2) become bonded to the aliphatic diisocyanates A1) via urethane groups, it is preferably an allophanatization which takes place subsequently. It is further preferable for isocyanurate structural units to be formed.

An alternative way to prepare the hydrophilic polyisocyanates A) typically involves reacting 1 mol of OH groups of the monofunctional polyalkylene oxide component A2) with 1.25 to 15 mol, preferably with 2 to 10 mol and more preferably 2 to 6 mol of NCO groups of a polyisocyanate A1) having an isocyanate functionality of 2 to 6, based on aliphatic diisocyanates. Exemplary of such polyisocyanates A1) are biuret structures, isocyanurates/uretdiones based on aliphatic diisocyanates. The polyisocyanate A1) and the polyalkylene oxide A2) are preferably linked together via a urethane group or a urea group, although particularly the linking via urethane groups is preferable.

The reaction can be carried out in the presence of urethanization catalysts such as tin compounds, zinc compounds, amines, guanidines or amidines, or in the presence of allophanatization catalysts such as zinc compounds.

The reaction temperature is typically in the range from 25 to 140° C. and preferably in the range from 60 to 100° C.

When excess low molecular weight diisocyanate was used, excess low molecular weight aliphatic diisocyanate is subsequently removed, preferably by thin film distillation.

Before, during and after the reaction or distillative removal of excess diisocyanate, acidic or alkylating stabilizers, such as benzoyl chloride, isophthaloyl chloride, methyl tosylate, chloropropionic acid, HCl or antioxidants, such as di-tert-butylcresol or tocopherol can be added.

Examples of low molecular weight aliphatic diisocyanates of component A1) are hexamethylene diisocyanate (HDI), isophorone diisocyanate (IPDI), butylene diisocyanate (BDI), bisisocyanatocyclohexylmethane (HMDI), 2,2,4-trimethylhexamethylene diisocyanate, bisisocyanatomethylcyclohexane, bisisocyanatomethyltricyclodecane, xylene diisocyanate, tetramethylxylylene diisocyanate, norbornane diisocyanate, cyclohexane diisocyanate or diisocyanatododecane, of which hexamethylene diisocyanate (HDI), isophorone diisocyanate (IPDI), butylene diisocyanate (BDI) and bis(isocyanatocyclohexyl)methane (HMDI) are preferable. Butylene diisocyanate (BDI), hexamethylene diisocyanate (HDI) and isophorone diisocyanate (IPDI) are more preferable and hexamethylene diisocyanate and isophorone diisocyanate or mixtures thereof are most preferable.

Examples of comparatively high molecular weight polyisocyanates A1) are polyisocyanates having an isocyanate functionality of 2 to 6 with isocyanurate, urethane, allophanate, biuret, iminooxadiazinetrione, oxadiazinetrione and/or uretdione groups based on the aliphatic and/or cycloaliphatic diisocyanates mentioned in the preceding section.

Preference for use as component A1) is given to comparatively high molecular weight compounds with biuret, iminooxadiazinedione, isocyanurate and/or uretdione groups based on hexamethylene diisocyanate, isophorone diisocyanate and/or 4,4'-diisocyanatodicyclohexylmethane. Isocyanurates are more preferable.

Structures based on hexamethylene diisocyanate are most preferable.

The monofunctional polyalkylene oxides A2) may in particular have an OH number of 15 to 150, preferably of 28 to 112.

The monofunctional polyalkylene oxides A2) may more particularly have an ethylene oxide content of 50 to 100 mol % and preferably of 60 to 100 mol %, based on the total amount of oxyalkylene groups present.

Monofunctional polyalkylene oxides for the purposes of the invention are compounds having just one isocyanate-reactive group, i.e., a group capable of reacting with an NCO group.

Preparing polyalkylene oxides A2) by alkoxylating suitable starter molecules is literature known (e.g., Ullmanns Encyclopädie der technischen Chemie, 4th edition, volume 19, Verlag Chemie, Weinheim pp. 31-38). Suitable starter molecules are especially saturated monoalcohols such as methanol, ethanol, n-propanol, isopropanol, n-butanol, isobutanol, sec-butanol, diethylene glycol monobutyl ether and also aromatic alcohols such as phenol or monoamines such as diethylamine. Preferred starter molecules are saturated monoalcohols of the aforementioned kind. It is particularly preferable to use diethylene glycol monobutyl ether or n-butanol as starter molecules.

The number average molecular weights of monofunctional polyalkylene oxides A2) are typically in the range from 220 to 3700 g/mol and preferably in the range from 500 to 2800 g/mol.

The monofunctional polyalkylene oxides A2) preferably have an OH group as isocyanate-reactive group.

Suitable 4-ring or 6-ring oligomers B) are heterocyclic are for example isocyanurates, iminooxadiazinediones or uretdiones of the aforementioned low molecular weight aliphatic diisocyanates. Heterocyclic 4-ring oligomers such as uretdiones are preferred.

It is preferable to use heterocyclic 4-ring oligomers as component B).

The increased isocyanate group content due to the use of component B) provides better foaming, since more $CO_2$ is formed in the isocyanate-water reaction.

The water to be used as component C) can be used as such, as water of crystallization of a salt, as solution in a dipolar aprotic solvent or else as an emulsion. Preferably, the water is used as such or in a dipolar aprotic solvent. It is preferred to use water as such.

To speed up urethane formation, component D) may utilize catalysts. The catalysts in question are typically compounds with which a person skilled in the art is familiar from polyurethane technology. Preference here is given to compounds from the group consisting of catalytically active metals, amines, amidines and guanidines. Specific examples are dibutyltin dilaurate (DBTL), tin acetate, 1,8-diazabicyclo[5.4.0]undecene-7 (DBU), 1,5-diazabicyclo[4.3.0]nonene-5 (DBN), 1,4-diazabicyclo[3.3.0]octene-4 (DBO), N-ethylmorpholine (NEM), triethylenediamine (DABCO), pentamethylguanidine (PMG), tetramethylguanidine (TMG), cyclotetramethylguanidine (TMGC), n-decyltetramethylguanidine (TMGD), n-dodecyltetramethylguanidine (TMGDO), dimethylaminoethyltetramethylguanidine (TMGN), 1,1,4,4,5,5-hexamethylisobiguanidine (HMIB), phenyltetramethylguanidine (TMGP) and hexamethyleneoctamethylbiguanidine (HOBG).

When catalysts are to be used, preference is given to the use of amines, amidines, guanidines or mixtures thereof. When catalysts are used, preference is also given to the use of 1,8-diazabicyclo[5.4.0]undecene-7 (DBU).

In a particularly preferred embodiment of the invention, catalysts are dispensed with completely.

Component E) may optionally utilize ammonium and alkali metal salts of $C_8$-$C_{22}$ monocarboxylates or their free carboxylic acids or $C_{12}$-$C_{44}$ dicarboxylates or their free dicarboxylic acids, preferably potassium or sodium salts of $C_8$-$C_{22}$ mono-carboxylates or $C_{12}$-$C_{44}$ dicarboxylates and more preferably sodium salts of $C_8$-$C_{22}$ monocarboxylates. Particular preference is given to using as component E) potassium or sodium salts of $C_8$-$C_{22}$ monocarboxylates or $C_{12}$—$C_{44}$ dicarboxylates, preferably sodium salts of $C_8$-$C_{22}$ monocarboxylates.

Examples of suitable compounds of component E) are the ammonium, sodium, lithium or potassium salts of ethylhexanoic acid, octanoic acid, decanoic acid, dodecanoic acid, palmitic acid, stearic acid, the octadecenoic acids, the octadecadienoic acids, the octadecatrienoic acids, isostearic acid, erucic acid, abietic acid and hydrogenation products thereof. Examples of $C_{12}$-$C_{44}$ dicarboxylic acids and the ammonium and alkali metal salts derived therefrom are dodecanedioic acid, dodecenylsuccinic acid, tetradecenylsuccinic acid, hexadecenylsuccinic acid, octadecenylsuccinic acid, $C_{36}$ and $C_{44}$ dimer fatty acids and hydrogenation products thereof and also the corresponding ammonium, sodium, lithium or potassium salts of these dicarboxylic acids.

Compounds of component F) can be used to improve foam formation, foam stability or the properties of the resulting polyurethane foam, in which case such additives can in principle be any known anionic, cationic, amphoteric and nonionic surfactants and also mixtures thereof. Preference is given to using alkylpolyglycosides, EO-PO block copolymers, alkyl or aryl alkoxylates, siloxane alkoxylates, esters of sulfosuccinic acid and/or alkali or alkaline earth metal alkanoates. Particular preference is given to using EO-PO block copolymers. Preferably, the EO-PO block copolymers are solely used as component F).

In addition, compounds of component G) can be used to improve the foam properties of the resulting polyurethane foam. These compounds comprise in principle any mono- and polyhydric alcohols known per se to a person skilled in the art, and also mixtures thereof. These are mono- or polyhydric alcohols or polyols, such as ethanol, propanol, butanol, decanol, tridecanol, hexadecanol, ethylene glycol, neopentyl glycol, butanediol, hexanediol, decanediol, trimethylolpropane, glycerol, pentaerythritol, monofunctional polyether alcohols and polyester alcohols, polyether diols and polyester diols.

Components A) to G) are typically used in the following amounts:
45 to 80 parts by weight of hydrophilic polyisocyanates A)
5 to 50 parts by weight of heterocyclic oligomers B)
1 to 50 parts by weight of water C)
0 to 1 part by weight of catalysts D)
0 to 5 parts by weight of $C_8$ to $C_{12}$ monocarboxylic acids or their ammonium or alkali metal salts or $C_{12}$ to $C_{44}$ dicarboxylic acids or their ammonium or alkali metal salts E),
0 to 10 parts by weight of surfactants F)
0 to 20 parts by weight of alcohols G).

Components A) to G) are preferably used in the following amounts:
45 to 80 parts by weight of hydrophilic polyisocyanates A)
5 to 50 parts by weight of heterocyclic oligomers B)
5 to 20 parts by weight of water C)
0 to 1 part by weight of catalysts D)
0.01 to 5 parts by weight of $C_8$ to $C_{12}$ monocarboxylic acids or their ammonium or alkali metal salts or $C_{12}$ to $C_{44}$ dicarboxylic acids or their ammonium or alkali metal salts E),
0 to 5 parts by weight of surfactants F)
0 to 10 parts by weight of alcohols G).

Components A) to G) are more preferably used in the following amounts:
50 to 70 parts by weight of hydrophilic polyisocyanates A)
20 to 40 parts by weight of heterocyclic oligomers B)
5 to 20 parts by weight of water C)
0 to 0.5 part by weight of catalysts D)
0.1 to 1 part by weight of $C_8$ to $C_{12}$ monocarboxylic acids or their ammonium or alkali metal salts or $C_{12}$ to $C_{44}$ dicarboxylic acids or their ammonium or alkali metal salts E),
0 part by weight of surfactants F)
0 part by weight of alcohols G).

The hydrophilic aliphatic polyurethane foams according to the invention are prepared by mixing the components A), B), C) and optionally B), D), E), F), G) in any order, foaming the mixture and curing, preferably by chemical crosslinking. The components A) and B) are preferably premixed with each other. The carboxylates E) optionally to be used and, if used, the surfactants F) are preferably added to the reaction mixture in the form of their aqueous solutions.

Foaming can in principle be effected by means of the carbon dioxide formed in the course of the reaction of the isocyanate groups with water, but the use of further blowing agents is likewise possible. It is thus also possible in principle to use blowing agents from the class of the hydrocarbons such as $C_3$-$C_6$ alkanes, for example butanes, n-pentane, isopentane, cyclopentane, hexanes or the like, or halogenated hydrocarbons such as dichloromethane, dichloromonofluoromethane, chlorodifluoroethanes, 1,1-dichloro-2,2,2-trifluoroethane, 2,2-dichloro-2-fluoro-ethane, particularly chlorine-free hydrofluorocarbons such as difluoromethane, trifluoromethane, difluoroethane, 1,1,1,2-tetrafluoroethane, tetrafluoroethane (R 134 or R 134a), 1,1,1,3,3-pentafluoropropane (R 245 fa), 1,1,1,3,3,3-hexafluoropropane (R 256), 1,1,1,3,3-pentafluorobutane (R 365 mfc), heptafluoropropane, or else sulfur hexafluoride. Mixtures of these blowing agents can also be used.

Subsequent curing typically takes place at room temperature. If necessary, residual moisture (water) can be removed from the foam using conventional methods of drying such as, for example, convective air drying or microwave drying.

The present invention further provides hydrophilic aliphatic polyurethane foams obtainable according to the method of the invention.

The polyurethane foams have a porous, at least partially open-cell structure having intercommunicating cells. The density of the polyurethane foams is typically in the range from 0.01 to 0.5 g/cm$^3$ (determined according to DIN 53420).

Physiological saline absorbence of the polyurethane foams is typically 25 to 150 g per 100 cm$^2$ in the case of a 5 mm thick foam. The measurement is carried out here according to the following method: (determination according to DIN EN 13726-1 Part 3.2).

Compared with other hydrophilic foams, the polyurethane foams according to the invention provide a very high physiological saline absorbance even without the use of superabsorbent polymers. However, the incorporation of superabsorbents is also possible with the polyurethane foams according to the invention, as will be appreciated.

The polyurethane foams have good mechanical strength and high elasticity. Tensile strength is typically greater than 40 kPa, breaking extension greater than 30% and rebound elasticity greater than 60% (determined according to DIN 53504, DIN 53455, DIN EN ISO 3386-1).

After they have been prepared, the polyurethane foams can be made into sheetlike materials in a conventional manner and then can be used, for example, as a constituent of a wound dressing, of a cosmetic article or of an incontinence product. Generally, to this end, slab foams are cut to the desired thickness by common methods by means of which sheetlike materials having a thickness of typically from 10 μm to 5 cm, preferably from 0.1 mm to 1 cm, more preferably from 0.1 mm to 6 mm and most preferably from 0.2 mm to 6 mm, are to be obtained.

However, the sheetlike materials described can also be obtained directly using suitable casting techniques, by application and foaming of the composition according to the invention onto a substrate, for example an optionally pretreated paper or textile.

In a preferable version, a mixture of the starting materials is for this purpose, as described in the as yet unpublished European application numbered 09009202.4, applied to a substrate by blade coating whereupon, subsequent to the blade coating, the foaming up takes place. The gap height of the blade coater is generally in the range from 0.2 to 20 mm, preferably in the range from 0.5 to 5 and most preferably in the range from 0.8 to 2 mm. The film width of the blade coater to be used can be adapted to the particular purpose of use. Examples are film widths between 10 and 5000 mm and preferably between 20 and 2000 mm.

The polyurethane foams generally contain a but minimal water-extractable fraction of not more than 2% by weight and preferably of not more than 1% by weight; i.e., they contain only very small amounts of constituents which are not chemically bound.

The polyurethane foams may moreover be adhered to or laminated or coated with further materials, for example materials based on hydrogels, (semi)permeable films, foam films, coatings, hydrocolloids or other foams.

The present invention also provides for the use of the hydrophilic aliphatic polyurethane foams as wound dressing, cosmetic article or incontinence product.

The polyurethane foams according to the invention are particularly useful in the manufacture of wound dressings. In these dressings, the polyurethane foams can be in direct or indirect contact with the wound. Preferably, however, the polyurethane foams are used in direct contact with the wound in order that optimum absorbence of wound fluid may be ensured for example. The polyurethane foams exhibit no cytotoxicity (determined according to ISO 10993-5 and ISO 10993-12).

The polyurethane foams which are used as wound dressing can be additionally sterilized in a further operation. The sterilization is effected using processes known per se to one skilled in the art, wherein sterilization is effected by thermal treatment, chemical substances such as ethylene oxide or irradiation, for example by gamma irradiation. Irradiation here may be carried out under protective gas atmosphere, where appropriate. The polyurethane foams according to the invention here have the immense advantage of not discoloring on irradiation, in particular on irradiation with gamma rays.

It is likewise possible to add, incorporate or coat antimicrobially or biologically active components which have a positive effect for example in relation to wound healing and the avoidance of germ loads.

EXAMPLES

Unless stated otherwise, all percentages are by weight. Solids contents were determined according to DIN-EN ISO 3251. Viscosities were determined at 23° C. to DIN 53019. NCO contents were determined volumetrically in accordance with DIN-EN ISO 11909.

Hardness (Shore 000) was measured at 23° C. using a Zwick 3137 instrument with the "Sphere Ø½ inch" penetrator and a pressdown force of 0.4 kg. Spring force is 1.10853 N. Instrument manufacturer: Zwick GmbH & Co. KG, Ulm, Germany.

The blade coater used was a Zehntner ZUA 2000 universal applicator having a film width of 200 mm and a gap height adjustable from 0 to 3 mm (from Zehntner GmbH, Sissach, Switzerland).

Physiological saline absorbence is measured to DIN EN 13726-1 Part 3.2)

Substances and Abbreviations Used:

Desmodur® N 3300: aliphatic polyisocyanate (HDI isocyanurate), NCO content 21.8%, Bayer MaterialScience AG, Leverkusen, Germany Desmodur® N 3400: aliphatic polyisocyanate (HDI uretdione), NCO content 21.8%, Bayer MaterialScience AG, Leverkusen, Germany

Example X1

Preparing a Hydrophilic Polyisocyanate (Building Block A)

A mixture of 282.5 g of Desmodur N 3300 and 843.8 g of a hydroxyl-monofunctional polyether based on ethylene oxide/propylene oxide (having an ethylene oxide content of 80 mol based on the total amount of oxyalkylene groups present), number average molecular weight 2250 g/mol (OH number 25 mg KOH/g) was stirred in a glass apparatus at 80° C. until the titrimetrically determined NCO group content was constant. This gave a liquid having an NCO content of 4.04% and a viscosity of 3330 mPas.

Example X2

Preparing a Hydrophilic Polyisocyanate (Building Block A)

A mixture of 214.5 g of Desmodur N 3300 and 990 g of a hydroxyl-monofunctional polyether based on ethylene oxide/propylene oxide (having an ethylene oxide content of 80 mol based on the total amount of oxyalkylene groups present), number average molecular weight 2250 g/mol (OH number 25 mg KOH/g) was stirred in a glass apparatus at 80° C. until the titrimetrically determined NCO group content was constant. This gave a liquid having an NCO content of 2.3% and a viscosity of 3700 mPas.

Preparation of Foamed Materials

The two isocyanate components (building block A) and optional building block B) were homogenized for 15 seconds using a stirrer speed of 1200 rpm, then the further components were weighed in, stirring was continued for a further 10 seconds and the mixture was applied to siliconized release paper using a blade coater (gap height 1.5 mm). The oligomer (building block B)), if used, was Desmodur® N 3400 in each case; as carboxylate, a 5% solution of sodium oleate in water was used. Extra water added is reported separately.

| Component [g] | 1* | 2 | 3 | 4 | 5 | 6 | 7 | 8* |
|---|---|---|---|---|---|---|---|---|
| hydrophilic PIC (building block A) from ex.X1 | 75 g | 75 g | 75 g | 75 g | — | — | — | 0 |

-continued

| Component [g] | 1* | 2 | 3 | 4 | 5 | 6 | 7 | 8* |
|---|---|---|---|---|---|---|---|---|
| hydrophilic PIC (building block A) from ex.X2 | — | — | — | — | 75 | 75 | 75 | 0 |
| oligomer (building block B) Desmodur N 3400 | 0 g | 8.33 g | 25 g | 50 g | 25 | 50 | 75 | 75 |
| water (building block C) | 3.49 g | 3.49 g | 3.49 g | 3.49 g | 3.49 | 3.49 | 3.49 | 3.49 |
| sodium oleate (building block E) as 5% by weight solution in water | 8.15 g | 8.15 g | 8.15 g | 8.15 g | 8.15 | 8.15 | 8.15 | 8.15 |
| Raw density [g/1000 cm$^3$] | — | 349 | 113 | 66 | 294 | 146 | 88 | — |
| hardness (Shore 000) | — | 57 | 28 | 35 | 48 | 25 | 40 | — |
| absorbence according to DIN EN 13726-1 Part 3.2 | — | 1810 | 1602 | 1157 | 968 | 1027 | 906 | — |

*Comparative examples not in accordance with the present invention

The inventive examples are flexible foams having a hardness (Shore 000)<80, a low density <400 g/l and a high physiological saline absorbence (>500%).

Inventive examples 3 and 4 from the preferred scope exhibit a viscoelastic character coupled with low hardness and hence are particularly conformable to the skin.

Comparative example 1 shows that without non-hydrophilic polyisocyanate (building block B)) the foam obtained does not have any firm consistency (it crumbles).

Comparative example 8 shows that, without hydrophilic polyisocyanate (building block A)) it is not a foam which is obtained but a film.

It was found that hydrophilic flexible foams are obtainable by combining hydrophilic and non-hydrophilic polyisocyanates and reacting this mixture with water (example 2, 3, 4, 5, 6, 7). It has transpired that what is obtained without hydrophilic polyisocyanate (building block A)) is not a foam but a transparent film (example 8), and that what is obtained without non-hydrophilic polyisocyanates (building block B)) (example 1) is in turn a brittle foam without coherency, which immediately turns into crumbs.

The invention claimed is:

1. A process for preparing hydrophilic aliphatic polyurethane foams wherein compositions comprising
    A) hydrophilic polyisocyanates obtainable by reaction of
        A1) low molecular weight aliphatic diisocyanates having a molar mass of 140 to 278 g/mol and/or polyisocyanates obtainable therefrom with an isocyanate functionality of 2 to 6, with
        A2) monofunctional polyalkylene oxides having an OH number of 10 to 250, and an ethylene oxide content of 50 to 100 mol % based on the total amount of oxyalkylene groups present,
    B) heterocyclic 4-ring or 6-ring oligomers of low molecular weight aliphatic diisocyanates having a molar mass of 140 to 278 g/mol,
    C) water,
    D) optionally catalysts,
    E) optionally $C_8$ to $C_{22}$ monocarboxylic acids or their ammonium or alkali metal salts or $C_{12}$ to $C_{44}$ dicarboxylic acids or their ammonium or alkali metal salts,
    F) optionally surfactants,
    G) optionally mono- or polyhydric alcohols, and
    H) no isocyanate-functional prepolymer having a weight fraction of low molecular weight aliphatic diisocyanates having a molar mass of 140 to 278 g/mol of below 1.0% by weight based on the prepolymer, obtainable by reaction of
        H1) low molecular weight aliphatic diisocyanates having a molar mass of 140 to 278 g/mol with
        H2) di- to hexafunctional polyalkylene oxides having an OH number of 22.5 to 112 mg KOH/g and an ethylene oxide content of 50 to 100 mol % based on the total amount of oxyalkylene groups present,
    are provided, foamed and cured.

2. The process of claim 1, wherein hydrophilic polyisocyanates A) having an NCO content of 0.3% to 20% by weight are used.

3. The process of claim 1, wherein exclusively hexamethylene diisocyanate, isophorone diisocyanate or mixtures thereof are used as low molecular weight aliphatic diisocyanates A1).

4. The process of claim 1, wherein monofunctional polyalkylene oxides A2) having an OH number of 15 to 150 are used.

5. The process of claim 1, wherein heterocyclic 4-ring oligomers are used as component B).

6. The process of claim 1, wherein metal salts, amines, amidines and guanidines are used as catalysts D).

7. The process of claim 1, wherein potassium or sodium salts of C8 to C22 monocarboxylates or C12 to C44 dicarboxylates are used as component E).

8. The process of claim 1, wherein EO-PO block copolymers are used as surfactants F).

9. The process of claim 1, wherein ethanol, propanol, butanol, decanol, tridecanol, hexadecanol, ethylene glycol, neopentylglycol, butanediol, hexanediol, decanediol, trimethylolpropane, glycerol, pentaerythritol, monofunctional polyether alcohols and polyester alcohols, polyether diols and polyester diols and also mixtures thereof are used as mono- or polyhydric alcohols G).

10. The process of claim 1, wherein the components A) to H) are used in the following amounts:
    45 to 80 parts by weight of hydrophilic polyisocyanates A)
    5 to 50 parts by weight of heterocyclic oligomers B)
    1 to 50 parts by weight of water C)
    0 to 1 part by weight of catalysts D)
    0 to 5 parts by weight of $C_8$ to $C_{12}$ monocarboxylic acids or their ammonium or alkali metal salts or $C_{12}$ to $C_{44}$ dicarboxylic acids or their ammonium or alkali metal salts E), 0 to 10 parts by weight of surfactants F)
0 to 20 parts by weight of alcohols G).

11. A polyurethane foam obtainable by the process of claim 1.

12. A wound dressing, cosmetic article, or incontinence product comprising the polyurethane foam of claim 11.

* * * * *